Oct. 5, 1948.  R. LEPSOE ET AL  2,450,865
FILTER
Original Filed June 7, 1943　　　2 Sheets-Sheet 1
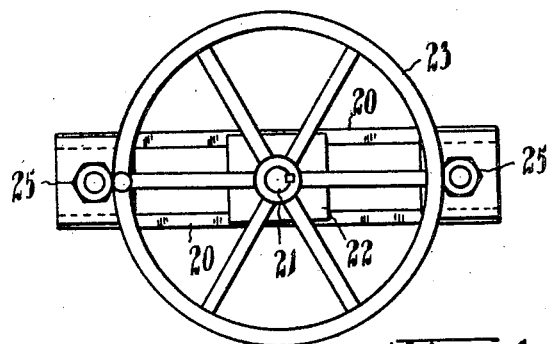
Fig. 1.
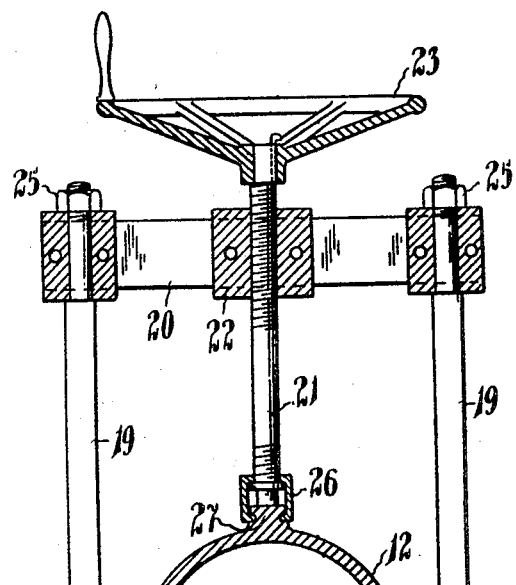
Fig. 2.
Inventors
R. Lepsoe
E. L. Jones
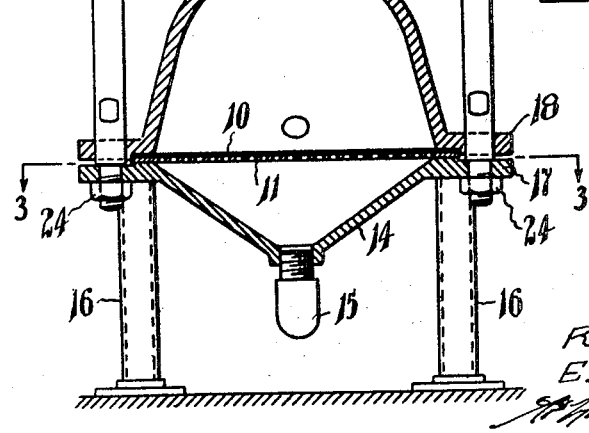
ATTY.

Oct. 5, 1948.  R. LEPSOE ET AL  2,450,865
FILTER
Original Filed June 7, 1943  2 Sheets-Sheet 2
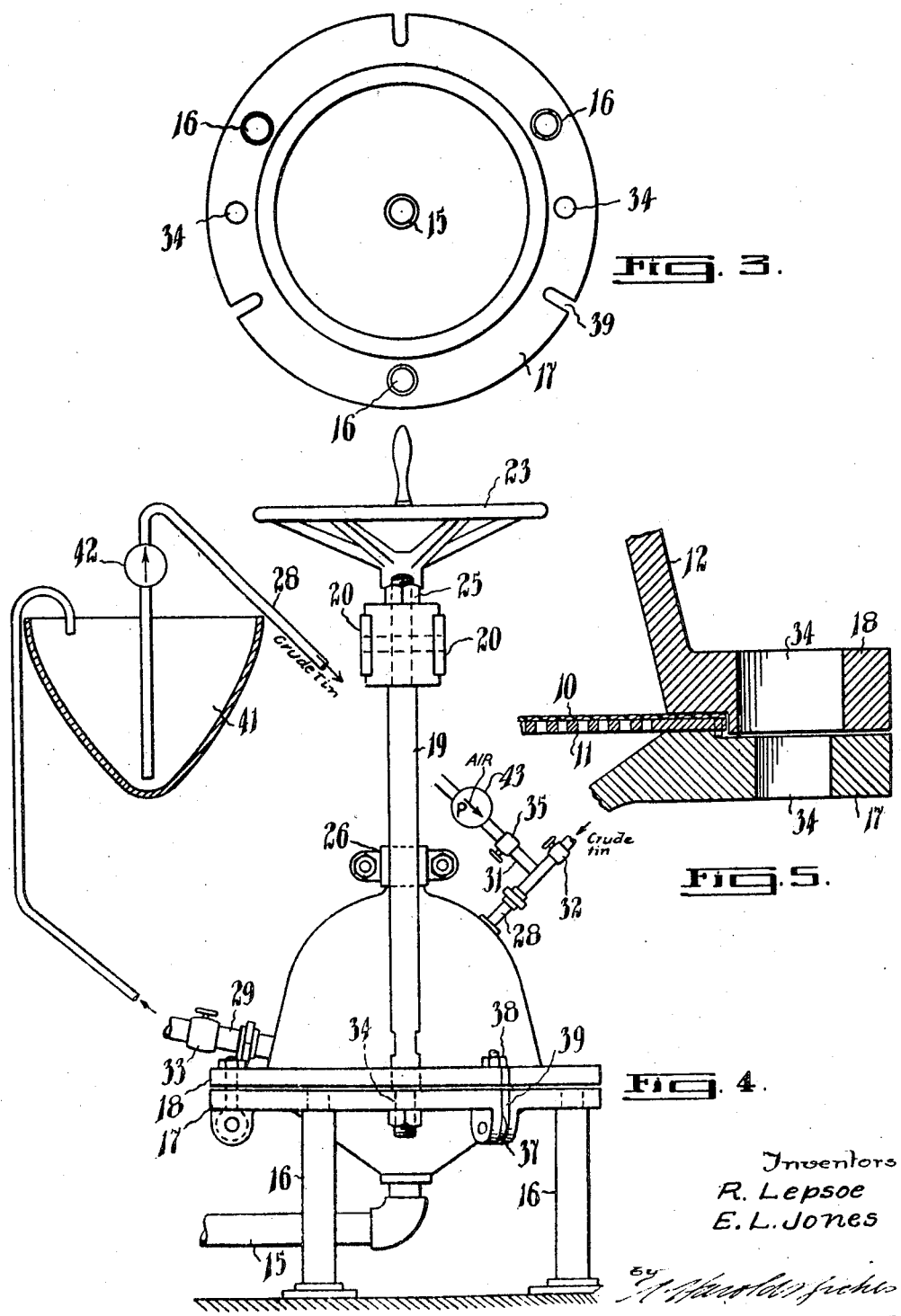
Inventors
R. Lepsoe
E. L. Jones Patented Oct. 5, 1948

2,450,865

UNITED STATES PATENT OFFICE 2,450,865

FILTER

Robert Lepsoe and Edward Llewelyn Jones, Trail, British Columbia, Canada, assignors to The Consolidated Mining and Smelting Company of Canada, Limited, Montreal, Quebec, Canada, a corporation of Canada Original application June 7, 1943, Serial No. 489,930. Divided and this application June 3, 1944, Serial No. 538,608

3 Claims. (Cl. 210—62)

This invention relates to a new and useful filter and is particularly directed to providing an apparatus for effecting the substantially complete removal of iron from crude and refined tin.

This application is a division of our application for Letters Patent of the United States of America No. 489,930, filed June 7, 1943, now abandoned.

Iron is usually present in tin concentrates and is an objectionable impurity throughout tin smelting and refining processes. The iron-tin alloys, in particular, cause considerable difficulty in refining operations. The published literature provides little information on methods for the elimination of iron from crude and refined tin. The adverse effect of the presence of even small amounts of iron on the working properties of the refined tin is relatively well known, of course, and a number of proposals have been suggested for the treatment of the tin concentrates or the crude metal for the recovery therefrom of a refined tin substantially free from iron. Such proposals as are described in the published literature on the subject involve relatively costly and complicated operational procedures and result in uneconomical losses of the metal of interest.

It has been found that iron is soluble in tin at high temperatures, for example, a mixture of iron and tin containing up to about 19% iron is liquid at temperatures above 1100° C. As the temperature is lowered, an iron-tin compound begins to crystallize out of the molten mixture. At 500° C., the iron-tin compound has the formula $FeSn_2$. The iron continues to crystallize out of the liquid as $FeSn_2$ until, at temperatures approximating the melting point of tin, 232° C., substantially all the iron originally contained in the mixture has crystallized in the form of an iron-tin compound, leaving the molten tin substantially free from iron. At temperatures approaching the melting temperature of tin, therefore, only two phases are present in the mixture, solid $FeSn_2$ and liquid tin substantially free from iron.

Advantage has been taken of this solubility relationship to provide an apparatus suitable for effecting the substantially complete separation and removal of the iron contained in crude and refined tin.

A principal object of this invention is to provide a filtering apparatus, including a novel arrangement of parts, whereby molten tin passed into and through the apparatus is rapidly and completely separated from the solid iron-tin compound suspended in the molten tin.

A further object of the invention is to provide an inexpensively constructed, easily operated apparatus for effecting the substantially complete separation and removal of the iron content from iron-bearing crude or refined tin.

A filtering apparatus suitable for carrying out the objects of the invention includes, in general, a cover in communication with a filtrate receiving basing, a filtering medium between the cover and the basin, means for circulating molten tin from a holding pot to and through the cover, and means for forcing molten tin through the filtering medium whereby impurities insoluble in the molten tin under the prevailing temperature conditions are carried in suspension in the molten tin passed into the apparatus through the cover, and are retained on the filtering medium, and the molten tin, after passing through the filtering medium, is substantially free from such insoluble impurities.

An understanding of the manner in which the above and other objects of the invention are attained may be had from the following description, reference being made to the accompanying drawings in which:

Figure 1 is a top plan view of a preferred form of filtering apparatus of the present invention;

Figure 2 is a front elevation, in section, of the filtering apparatus;

Figure 3 is a plan view taken along the lines 3—3 of Figure 2;

Figure 4 is a side elevation; and

Figure 5 is an enlarged detail view of the filter plate.

Like reference characters refer to like parts throughout the specification and drawings.

A preferred form of apparatus embodying the features of the present invention comprises, in general, a cover 12, a perforated plate 11 on which is carried a filtering medium 10, and a filtrate receiving basin 14, the structural arrangement of which is described in detail hereinafter.

The filtrate receiving basin 14 is preferably of an inverted conical shape and is provided, at the bottom of the basin, with an outlet conduit 15 which extends to a casting pot (not show). The filtrate receiving basin is supported from the floor on columns 16, the upper ends of which are joined to the uppermost rim of the basin, which rim extends beyond the wall of the basin in the form of a flange 17.

The cover 12 is preferably of a bell or dome shape, being referred to hereinafter as a filter bell, the base of which is formed with a flange 18 which seats on the flange 17 of the filtrate receiving basin 14, being locked in its fixed position on the flange 17 by the eye-bolts 37 which extend through the aligned slots 39. The filter plate 11, on which the filtering medium is carried is in the form of a perforated plate which extends between the filter bell and the basin, and is secured between the flanges 17 and 18, the filtering medium 10 serving to seal the joints between those flanges.

A preferred arrangement for lifting the filter bell 12 from its seat on the flange 17 comprises the columns 19, which pass through aligned holes 34 in the flanges 17 and 18, the cross member 20, the threaded shaft 21 and the hand wheel 23.

The columns 19 are secured at their lower ends to the under surface of the flange 17 by the nuts 24, and at their upper ends to the cross member 20 by the nuts 25. The cross member 20 is drilled vertically at its centre and is tapped to receive, in threaded engagement, the threaded shaft 21. The handwheel 23 is keyed to the upper end of the shaft 21 above the cross member 20. The lower end of the shaft is secured to the upper end of the filter bell by a conventional lifting arrangement, such as by a collar or ring 26 which is fitted into a groove cut into a projection or boss 27 extending upwardly from the centre of the surface of the filter bell and into another groove or slot formed in the lower end of the shaft. The filter bell is raised from and lowered to its seat on the flange 17 by turning the handwheel 23, the columns 19 serving as guides to hold the bell in alignment with its position on the seat.

When the filtering apparatus is assembled, the filter bell is firmly secured to the filtrate receiving basin by the eye-bolts 37 which pass through aligned slots 39 in the flanges 17 and 18 and are secured in their fixed position by the nuts 38.

The filter bell is provided with an inlet pipe 28 extending from a holding pot 41 to the upper part of the filter bell. An air pipe 31 extends from an air compressor 43 to the inlet pipe 28. An outlet pipe 29 extends from the lower part of the filter bell to the holding pot. Each of the inlet and outlet pipes 28 and 29 is provided with a valve 32 and 33 respectively, to regulate the flow of metal therethrough.

The operation of the apparatus is described hereinafter as applied to the filtration of molten iron-bearing tin in which the iron content is in the form of solid particles of iron-tin compound suspended in and dispersed throughout the molten tin. The filter is first heated to prevent solidification of the tin passed thereinto. In heating, care must be taken to avoid raising the temperature of the filter to a temperature at which the iron-tin compound would be soluble in the tin to any appreciable extent. In normal operations, the molten iron-bearing tin is stored in the holding pot at a temperature above 232° C., the melting temperature of the tin, and preferably below 400° C. It is found that by circulating the tin from the holding pot through the filter bell 12 and thence back to the holding pot, the filter bell is heated to the desired operating temperature without any danger of overheating.

The apparatus is first assembled and all connections are made secure. The filter is then heated by circulating, by means of pump 42, molten tin from the holding pot through pipe 28, through the filter bell 12 and out the outlet pipe 29 for return to the holding pot, the valves 32 and 33 being open to permit the unrestricted flow through those pipes. A certain minor amount of solidification of the crude tin may take place in the cover during the preliminary heating stages but this is quickly re-melted by the continuous flow of the hot metal. The resistance of the filtering medium 10 is sufficient to prevent the flow therethrough of appreciable amounts of molten metal while the valve 33 remains open.

When the filter has been heated to the desired temperature, the valve 33 in pipe 29 is closed and the molten tin passed into the filter is forced through the filtering medium 10, the filtrate being received in the filtrate receiving basin 14 from which it flows, by gravity, through the pipe 15 to a casting pot. After all the tin in the holding pot has been passed through the filter, the valve 35 in air pipe 31 is opened and compressed air is forced into and through pipe 28. The portion of the pipe 28 between air pipe 31 and the holding pot is first cleared by blowing that line free of tin to prevent solidification of tin therein. The valve 32 is then closed to increase the pressure on the filter cake which collected on the filtering medium during the filtering operation. The molten tin retained in the filter cake is forced through the cake and through the filter cloth into the filtrate receiving basin and then to the casting pot. When no more tin can be extracted from the cake by the pressure of the compressed air, the air is turned off and the air and metal inlet and outlet pipes to the filter bell are disconnected. The filter bell may then be raised on columns 19 by turning handwheel 23 to permit removal of the filter cake.

Ordinarily, the filtering apparatus is constructed of iron or steel. Metals which are soluble in tin, such as lead and copper, should not be used in parts which are contacted by the tin.

The preferred filtering medium is asbestos cloth. Satisfactory results have been obtained from the use of other filtering media such as cotton waste, blanket wool, felt, glass cloth, asbestos shreds, and asbestos powder. Asbestos cloth is preferred, however, as it is easily handled and provides a filtering medium which is of substantially uniform density. The periphery of the asbestos cloth also serves as a gasket to seal the joint between the flanges of the filter bell and the filtrate receiving basin.

The amount of crude tin that can be filtered without interrupting the filtering operation depends upon the capacity of the filter bell and upon the iron content of the metal. If the iron content is high, of course, the filter bell can be designed to accommodate the increased amount of filter cake which will be formed.

It has been found that a satisfactory rate of filtering may be obtained when the metal from the holding pot is pumped into the filter bell under a pressure of from 15 to 30 pounds per square inch. Under the described conditions, a rate of filtration of about 4.5 pounds of metal per minute per square inch of filtering surface has been obtained.

Exemplifying the operation of the present method and apparatus, the iron content of the crude tin undergoing treatment is usually from 0.04% to 0.4% Fe, although tin containing as much as 6% iron has been successfully treated, the iron content being reduced to less than 0.007% Fe. Tin metal containing as little as 0.02% iron also has been treated by the present method and the iron content reduced to about 0.006% Fe. A reduction to 0.001% Fe has been obtained in some cases.

Filter cake from the treatment of the crude tin is found to contain from 10% to 15% Fe, that is, from 52% to 80% $FeSn_2$. The iron content of a filter cake 100% $FeSn_2$ would be approximately 19% Fe.

In the operation of the apparatus, the upper temperature limit for filtration depends upon the permissible iron content of the final product. It has been found, however, that filtering at temperatures of about 425° C. and higher will not product consistently tin containing less than 0.01% iron. Therefore, to produce tin containing consistently less than 0.01% iron, it is necessary to conduct the filtering operation at less than 425° C., for example about 400° C. or lower. It would follow that it would be preferable to operate within a temperature range closely approximating 232° C., the melting point of tin, as for example, 232° C. to 250° C. However, operating at a temperature so close to the melting point of tin presents practical difficulties in temperature control and in manipulation of the metal. It has been found that highly satisfactory operating results are obtained at temperatures between 250° C. and 400° C., preferably at about 350° C., the iron content of the resulting tin being less than 0.01%, and, at the same time, difficulties in temperature control and in manipulation of the metal are avoided.

While the apparatus has been described as being applied to the separation and removal of the iron content from iron-bearing crude or refined tin, it is applicable to the separation and removal of solid impurities from other molten metals, particularly metals having a relatively low melting temperature such as lead, tin, and lead-tin alloys. The apparatus is particularly effective for separating and removing the iron content from an iron-bearing crude and refined tin. The presence of iron in tin and its removal has constituted a difficult problem in the art due to the dispersal of the iron throughout the molten bath as solid crystalline particles of iron-tin compound of only slightly greater specific gravity than the specific gravity of the molten tin in which they are dispersed and, consequently, it has not been possible heretofore to separate effectively and substantially completely the iron-tin particles from the molten tin without attendant wasteful losses of the metal tin.

The advantages of the use of the present apparatus for the substantially complete removal of the impurity iron from the metal tin over the liquation, boiling and poling methods of the prior art are self evident. The equipment required is inexpensive and is easily constructed of readily available material. The time of treatment is greatly reduced in that a lot of ten tons of crude tin can be filtered in less than half an hour using a filter having a filtering surface only 16 inches in diameter. The amount of iron in the crude tin has little effect on the rate of filtration unless, of course, it is present in such large quantities as to form a cake exceeding the capacity of the filter bell, which contingency would normally be taken into consideration when designing the filter; or unless it exceeds much more than 6%, in which case the fluidity of the metal is so reduced that pumping and filtering become difficult.

The recovery of marketable tin from the crude product is of the order of 90% and higher. For example, a crude tin containing 0.5% iron may be filtered under the described conditions to produce marketable metal containing less than 0.01% iron, and a filter cake containing, for example, 10% iron. As almost all the iron is removed from the tin, a ton of crude metal would form a filter cake weighing about 100 pounds and including 10 pounds of iron. The recovery of marketable tin, therefore, would be of the order of about 95% of the original iron-bearing metal. Loss of metal by oxidation is, of course, avoided in the present process.

The treatment herein is equally applicable to reduce the iron content of refined tin or what is known as "Standard" tin. "Standard" tin must contain at least 99.75% tin. The chemical composition of pig tin must be in accordance with the following table if it is to meet with United States Government requirements:

| Grade | Sn (Min) | Pb (Max) | Sb (Max) | Zn | Cd | As (Max) | Cu (Max) | Fe (Max) | Bi (Max) | S (Max) |
|---|---|---|---|---|---|---|---|---|---|---|
| A (percent) | 99.75 | 0.10 | 0.10 | None | None | 0.10 | 0.10 | 0.01 | 0.01 | 0.01 |
| B (percent) | 98.00 | 1.50 | 1.50 | None | None | 0.10 | 0.10 | 0.10 | 0.10 | 0.01 |

Tin from various sources, such as from the Netherlands East Indies, may come well within the United States Government specifications for grade A tin except for its iron content. This iron content can be quickly and inexpensively reduced by the present apparatus to between 0.001% and 0.006%, and the tin thus brought up to grade A specification.

It will be understood that modifications from the preferred embodiment of the invention described and illustrated herein may be made by others skilled in the art in the light of the teachings herein.

What we claim as new and desire to protect by Letters Patent of the United States is:

1. Apparatus for filtering tin which comprises a filtrate receiving basin, an outlet for said basin, a cover for said basin detachably securable thereto in substantially air-sealing engagement, a filtering medium between said cover and said basin, an inlet conduit to said cover in communication with a source of supply of molten tin and with a source of supply of air under pressure, an outlet conduit from said cover in communication with the source of supply of molten tin, said conduits extending into said cover above said filtering medium and the inlet end of the outlet conduit being positioned adjacent to the filtering medium, valves in said conduits for regulating the flow of molten tin and air to said cover and molten tin from said cover, said inlet and outlet conduits being adapted to circulate molten tin from and to the source of supply through all parts of said cover and the valve in the outlet conduit being adapted to stop such circulation, pressure means for maintaining said circulation and for forcing molten tin through said filtering medium when said circulation is stopped, means for forcing through the filtering medium the molten tin contained in the residue retained thereon, and means for raising the cover for removal of the residue collected on the filtering medium.

2. Apparatus for filtering tin which comprises a filtrate receiving basin, an outlet for said basin, a cover for said basin detachably securable thereto in substantially air-sealing engagement, a filtering medium between said cover and said basin, an inlet conduit to said cover in communication with a source of supply of molten tin and with a source of supply of air under pressure, an outlet conduit from said cover in communication with the source of supply of molten tin, said conduits extending into said cover above said filtering medium and the inlet end of the outlet conduit being positioned adjacent to the filtering medium, valves in said conduits for regulating the flow of molten tin and air to said cover and molten tin from said cover, said inlet and outlet conduits being adapted to circulate molten tin from and to the source of supply through all parts of said cover and the valve in the outlet conduit being adapted to stop such circulation, pressure means for maintaining said circulation and for forcing molten tin through said filtering medium when said circulation is stopped, means for forcing through the filtering medium the molten tin contained in the residue retained thereon, and means for raising the cover in alignment with the basin for removal of the residue collected on the filtering medium.

3. Apparatus for filtering tin which comprises a filtrate receiving basin having a flanged upper rim, an outlet for said basin, a vertically disposed frame having side members and a transverse member above said basin, a bell shaped cover having a flanged lower rim, means for raising and lowering said cover in said frame out of and into engagement with said basin, means for detachably securing the cover and basin together in substantially air sealing engagement with a filtering medium therebetween, an inlet conduit to said cover in communication with a source of supply of molten tin and with a source of air under pressure, an outlet conduit from said cover in communication with the source of supply of molten tin, said conduits extending into said cover above said filtering medium and the inlet end of the outlet conduit being positioned adjacent to the filtering medium, valves in said conduits for regulating the flow of molten tin and air to said cover and molten tin from said cover, said inlet and outlet conduits being adapted to circulate molten tin from and to the source of supply through all parts of said cover and the valve in the outlet conduit being adapted to stop such circulation, pressure means for maintaining said circulation and for forcing molten tin through said filtering medium when the circulation is stopped, and means for forcing through the filtering medium the molten tin contained in the residue retained thereon.

ROBERT LEPSOE.
EDWARD LLEWELYN JONES.

REFERENCES CITED

The following references are of record in the file of this patent:

UNITED STATES PATENTS

| Number | Name | Date |
|---|---|---|
| 776,222 | Derham | Nov. 29, 1904 |
| 1,181,729 | Brown | May 2, 1916 |
| 1,567,990 | Apablasa | Dec. 29, 1925 |
| 1,656,200 | Horning | Jan. 17, 1928 |
| 1,710,398 | Bakken | Apr. 23, 1929 |
| 1,749,730 | Kenney | Mar. 4, 1930 |
| 1,820,141 | Jessup | Aug. 25, 1931 |
| 1,948,479 | Caminez | Feb. 20, 1934 |
| 1,988,227 | Wirth | Jan. 15, 1935 |
| 1,995,593 | Wefelscheid | Mar. 26, 1935 |
| 2,063,742 | Holmes | Dec. 8, 1936 |
| 2,068,395 | Burckhalter | Jan. 19, 1937 |
| 2,106,863 | Whitney | Feb. 1, 1938 |
| 2,214,671 | Hagan | Sept. 10, 1940 |
| 2,335,365 | Smith | Nov. 30, 1943 |

FOREIGN PATENTS

| Number | Country | Date |
|---|---|---|
| 16,987 | Great Britain | Dec. 29, 1884 |
| 646,230 | France | July 10, 1928 |